(12) United States Patent
McKee et al.

(10) Patent No.: US 6,950,135 B2
(45) Date of Patent: Sep. 27, 2005

(54) METHOD AND APPARATUS FOR GATHERING THREE DIMENSIONAL DATA WITH A DIGITAL IMAGING SYSTEM

(75) Inventors: Bret A. McKee, Fort Collins, CO (US); Blaine D. Gaither, Fort Collins, CO (US); Michael J Mahon, Bellevue, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 845 days.

(21) Appl. No.: 09/768,477

(22) Filed: Jan. 24, 2001

(65) Prior Publication Data

US 2002/0096624 A1 Jul. 25, 2002

(51) Int. Cl.[7] .......................... H04N 3/14; H04N 5/335; G03B 13/18; G06K 9/00
(52) U.S. Cl. .................. 348/297; 396/96; 396/171; 382/106
(58) Field of Search ................... 348/296, 297, 348/298, 348; 396/96, 100, 106, 121, 122, 123, 171; 356/4.01, 4.07; 382/106

(56) References Cited

U.S. PATENT DOCUMENTS 6,373,557 B1 * 4/2002 Mengel et al. ............. 356/4.07
6,580,454 B1 * 6/2003 Perner et al. ............... 348/302
6,665,010 B1 * 12/2003 Morris et al. ............... 348/297
6,721,007 B1 * 4/2004 Tani et al. .................. 348/296

* cited by examiner

Primary Examiner—Wendy R. Garber
Assistant Examiner—Justin Misleh
(74) Attorney, Agent, or Firm—Leslie P. Gehman

(57) ABSTRACT

A digital image capture device including circuits capable of measuring the distance between the image capture device and an imaged object allows the capture of three-dimensional data of the surface of the object facing the image capture device. The distance data is obtained by the addition of a flash unit, and very high resolution timers to multiple pixels within the image capture device to measure the time required for the flash to reflect from the object. Since the speed of light is constant, the distance from the flash to the object to the image capture device may be calculated from the delay for the light from the flash to reach the device. Multiple pixels may be used to construct a three-dimensional model of the surface of the object facing the image capture device. Multiple images including distance data may be taken in order to generate a complete three-dimensional model of the surface of the object.

18 Claims, 3 Drawing Sheets

METHOD AND APPARATUS FOR GATHERING THREE DIMENSIONAL DATA WITH A DIGITAL IMAGING SYSTEM

FIELD OF THE INVENTION

The present invention relates to the field of digital image acquisition, and more particularly, to the field of three-dimensional digital image acquisition.

BACKGROUND OF THE INVENTION

Three-dimensional (stereoscopic) imaging dates from very near the invention of photography. N. Niepce, L. J. M. Daguerre, and Henry Fox Talbot invented two very different photographic processes between 1826 and 1837. In 1839 Daguerre, Hippolyte Bayard, and Talbot published details on these two photographic methods. Niepce and Daguerre disclosed a process using photosensitized metal, while Bayard and Talbot disclosed two slightly different processes using photosensitized paper. The process of Niepce and Daguerre, named daguerreotype, was an immediate success, while the paper processes of Bayard and Talbot did not gain prominence until the perfection of bromide papers in the 1880's. While the principles of stereoscopy were known from the early 1800's, the theories remained unproven until 1838 when Sir Charles Wheatstone published, "Contributions to the Physiology of Vision—on Some Remarkable, and Hitherto Unobserved, Phenomena of Binocular Vision" as a paper presented to the British Royal Society. Wheatstone demonstrated that the mind perceives an object in three dimensions because each eye records a slightly different view. In 1839, a Mr. Collen and Talbot created stereoscopic images using Talbot's processes for Wheatstone, and stereoscopic imaging was born.

Throughout the history of photography one of the major difficulties of stereoscopic imaging, has been the requirement of special equipment and techniques to capture and view stereoscopic images. This need for special equipment and techniques contribute to the fact that stereoscopic imaging is so uncommon today. In 1851 Sir William Brewster invented the lenticular stereoscope, the first stereoscopic viewer usable by the average person. Eight years later, in 1859, Oliver Wendell Holmes, along with Joseph L. Bates, constructed the first version of the now famous hand-held stereoscope, commonly referred to as the Holmes stereoscope. Holmes and Bates neglected to patent their invention, and within several years, the Holmes stereoscope was in production by a number of different opticians throughout the United States.

The first stereoscopic images were produced using a single camera that was shifted between exposures. This method is only usable in capturing static images. When movement occurs in the time between the two exposures, the left and right images will capture the moving object at slightly different locations and retinal rivalry will occur. Because of this limitation, a camera capable of capturing simultaneous left and right images is required in most situations. The use of two images to capture three-dimensional information of an object is well known. However, there is a need in the art for an apparatus and method for capturing three-dimensional information from a single image, since such an image capture device would require only a single lens and shutter, thus lowering the cost of such a camera.

Three-dimensional data is also required in the construction of models for use in computer-aided-design (CAD) and computer-aided-manufacturing (CAM) systems. Currently, the generation of three-dimensional data from an existing object is a time-consuming chore. Specialized hardware exists to capture such three-dimensional data, but may be large and expensive. There is a need in the art for a simple, inexpensive image capture device capable of capturing three-dimensional data.

SUMMARY OF THE INVENTION

A digital image capture device including circuits capable of measuring the distance between the image capture device and an imaged object allows the capture of three-dimensional data of the surface of the object facing the image capture device. The distance data is obtained by the addition of a flash unit, and very high resolution timers to multiple pixels within the image capture device to measure the time required for the flash to reflect from the object. Since the speed of light is constant, the distance from the flash to the object to the image capture device may be calculated from the delay for the light from the flash to reach the device. Multiple pixels may be used to construct a three-dimensional model of the surface of the object facing the image capture device. Multiple images including distance data may be taken in order to generate a complete three-dimensional model of the surface of the object.

Other aspects and advantages of the present invention will become apparent from the following detailed description, taken in conjunction with the accompanying drawings, illustrating by way of example the principles of the invention.

DETAILED DESCRIPTION

Figure 1:
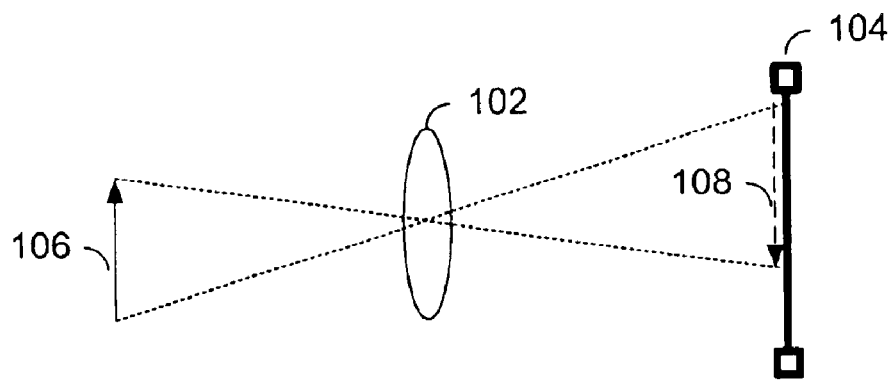
FIG. 1 is a block diagram of an image capture system.

FIG. 1 is a block diagram of an image capture system. The basic components of a digital image capture system are a lens 102 and an image capture array 104 such as a CCD or other device. In capturing an image of an object 106, the lens focuses an image 108 of the object on the image capture array 104.

Figure 2:
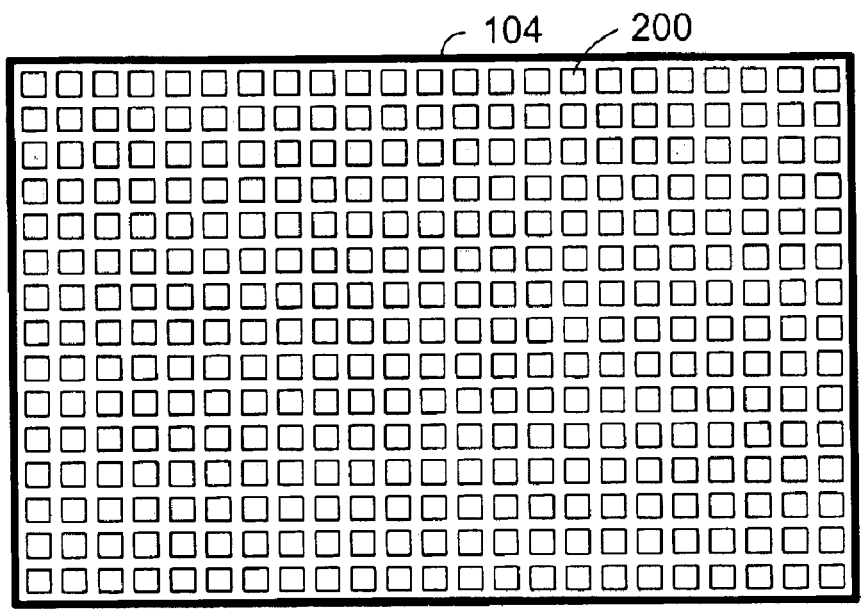
FIG. 2 is a graphical representation of an image capture array.

FIG. 2 is a graphical representation of an image capture array 104. In this particular figure a 15 by 23 array of 345 pixel sensors 200 is shown. Each pixel sensor 200 records light intensity of a portion of the image. The pixel sensors 200 may record only light intensity recording a black and white image, or there may be red, green, and blue pixel sensors 200 in the array recording a color image.

Figure 3:
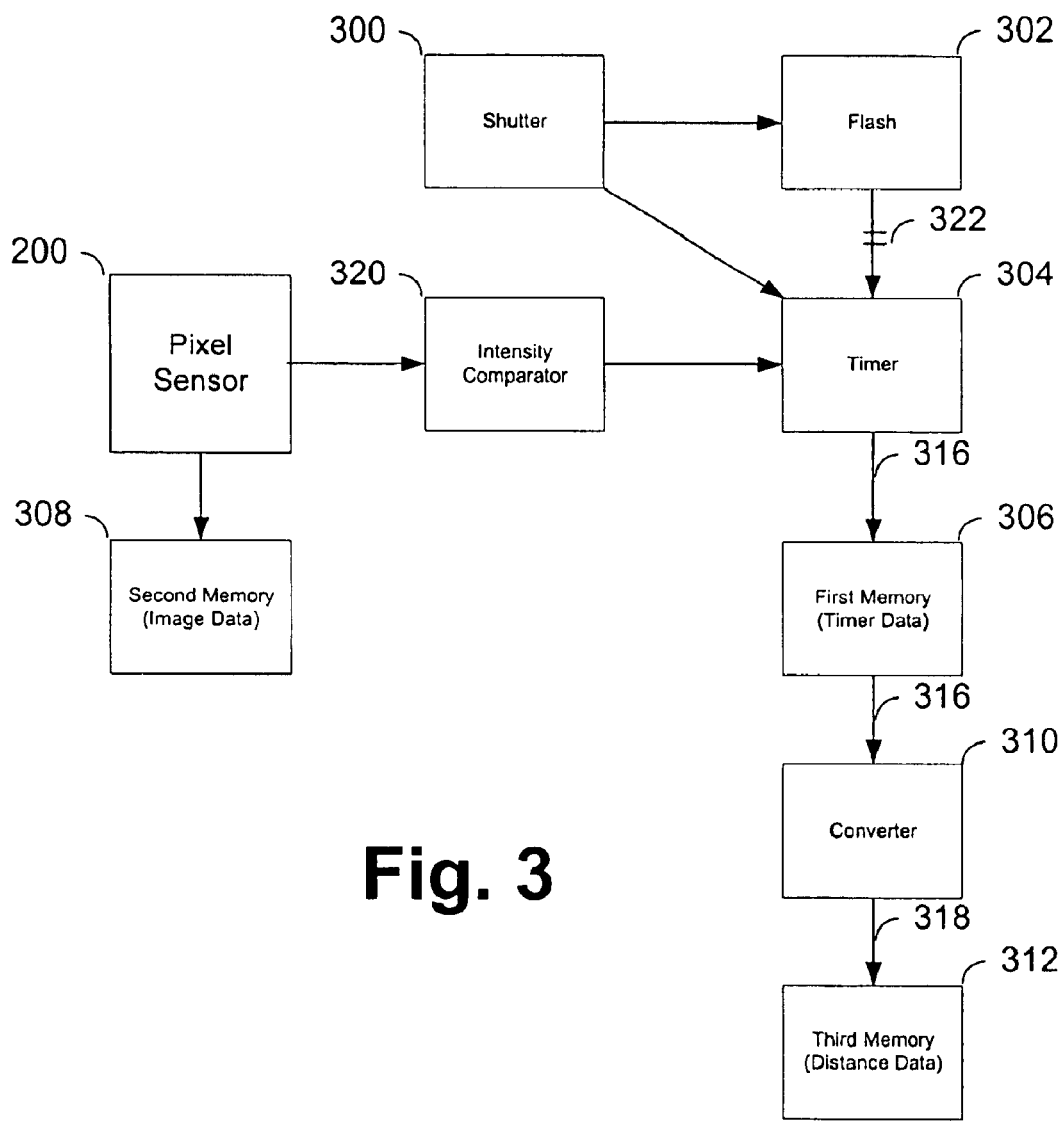
FIG. 3 is a block diagram of a portion of an image capture system.

FIG. 3 is a block diagram of a portion of an image capture system. This figure is representative of a single pixel sensor 200 and the devices associated with it to measure distance to the object recorded by that pixel sensor 200. When a shutter 300 is activated, a timer 304 is cleared, and a flash 302 is fired at the same time the timer 304 is started. Note that in some image capture systems, the flash 302 may be delayed from the activation of the shutter 300. For example, some systems pre-fire a light or light emitting diode (LED) for red-eye reduction before the main flash 302 is fired. The flash 302 does not have to use visible light. Other possible wavelengths of light, or other energy, may be used, including non-visible wavelengths such as infrared. Use of an infrared flash 302 would allow this invention to be used without a humanly visible flash, that may be required for some applications of the present invention. Also note that in some implementations, the flash may be external to the image capture device and coupled through an electrical connector 322. The timer 304 does not start counting until the main flash 302 is fired. Once the timer 304 is started, the pixel sensor 200 is monitored until it records a brightening in the image from the flash 302. This monitoring of the pixel sensor 200 may be done by an intensity comparator 320 built in to the sensor or the timer, or elsewhere within the circuitry of the image capture device. The amount of brightening of the image required to stop the timer 304 may be specified by a threshold brightness, calculated as a fraction of the initial brightness of the portion of the image recorded by the pixel sensor, or determined by other equivalent means. For example, the timer 304 may be stopped once the brightness increases by 150%. It may be desirable to allow the image capture device to set these thresholds dynamically and simply look for a step function type of change in intensity. Many different threshold mechanisms and methods may be used within the bounds of the present invention. Once the pixel sensor 200 receives the light from the flash 302, the timer 304 is stopped and the timer data may be stored in a first memory 306. This first memory 306 in some implementations of the present invention may be as simple as a register contained within the timer 304. The image data from the pixel sensors 200 is stored in a second memory 308. Since the speed of light is constant (or nearly so), the distance to the portion of the object imaged by the pixel sensor 200 may be calculated by a converter 310 that converts the timer data to distance data and stores the distance data in a third memory 312. This circuitry is replicated for a plurality of pixel sensors 200. It isn't necessary to have timers 304 associated with each pixel sensor 200 in the image capture array 104. For example, there may be one timer for each 2×2 block of pixel sensors 200, or for each 4×4 block of pixel sensors 200, or any of numerous other possible distributions within the scope of the present invention. When more than one pixel sensor 200 is associated with a single timer, the timer may be controlled by one of the pixel sensors 200, or a combination of several or all of the pixel sensors 200. However, when all of the pixel sensors 200 have timers 304 the granularity of the distance data will be equal to the granularity of the image data.

Figure 4:
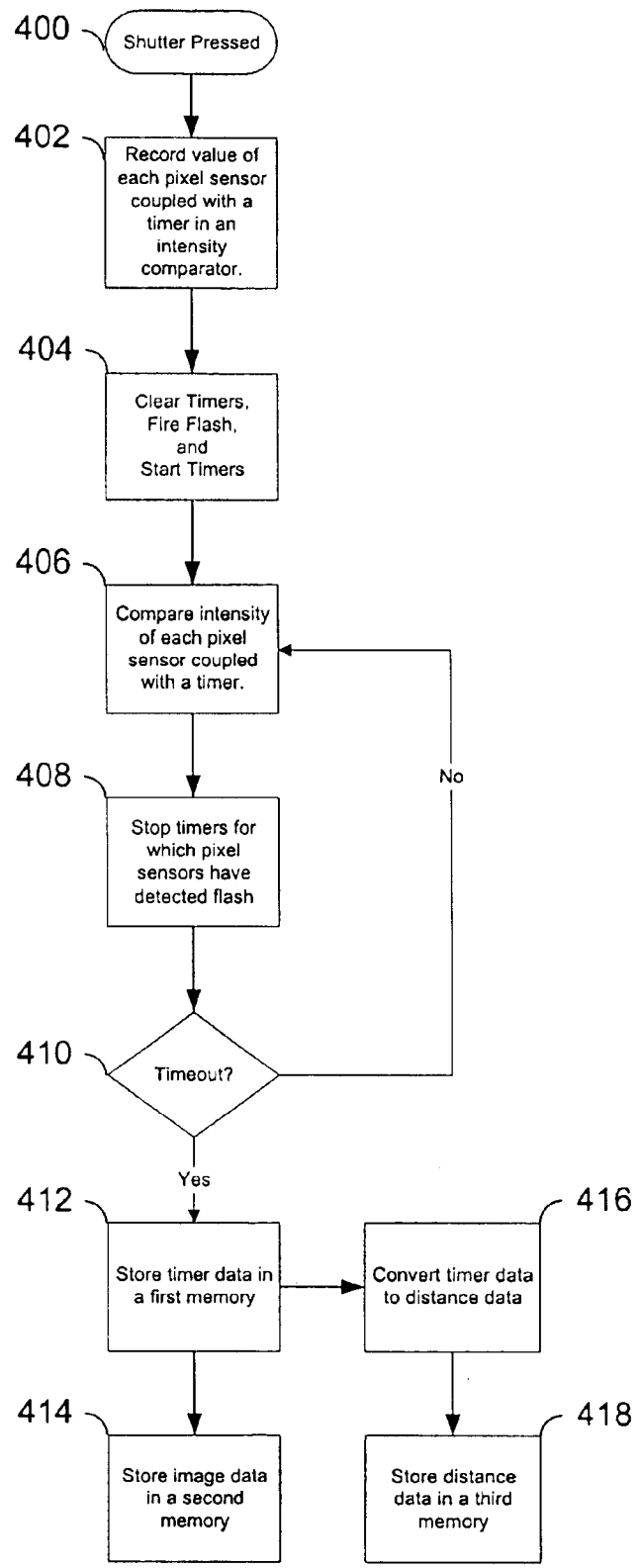
FIG. 4 is a flow chart of a process for gathering three-dimensional data with an image capture system.

FIG. 4 is a flow chart of a process for gathering three-dimensional data with an image capture system. In a step 400, the shutter 300 of the image capture device is pressed and control is passed to a step 402 where the intensity value of each pixel sensor 200 coupled with a timer 304 is recorded into one side of the intensity comparator 320. Control is then passed to a step 404 where all of the timers 304 are cleared, the flash 302 is fired, and all of the timers 304 are started at the time the flash 302 is fired. Control is then passed to a step 406 where the intensity value of each pixel sensor 200 coupled with a timer 304 is checked by the intensity comparator 320. In a step 408 the timers 304 associated with each pixel sensor 200 that detected the flash 302 are stopped. In a decision step 410, if a timeout (or maximum allowable time) has been reached control passes to a step 412. If no timeout or maximum allowable time has been reached, control returns to a step 406. The timeout or maximum allowable time may be calculated and set in a number of ways within the present invention. Since most flash units 302 have a maximum effective range, it is possible to calculate the time required to travel that distance to the object then back to the image sensor array 104. Setting the maximum allowable time to this value then ensures that objects within the range of the flash 302 will have their distances to the image sensor array 104 determined, and objects outside the range of the flash will have their distances set to a maximum value. It is also possible to calculate a maximum allowable time from a given maximum allowable distance (possibly set by the user). In a step 412 the timer data 316 from all of the timers 304 is stored in a first memory 306, and in a step 414 the image data 314 from the image sensor array 104 is stored in a second memory 308. In an optional step 416, the timer data 316 from the first memory 306 is converted to distance data 318 (using the known speed of light), and in an optional step 418 the distance data 318 is stored in a third memory 312.

The foregoing description of the present invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An image capture device comprising:

a plurality of pixel sensors;

a plurality of timers individually coupled with each of said pixel sensors;

a plurality of intensity comparators coupled with said timers and said pixel sensors; and a flash coupled with said timers, wherein said timers are started when said flash fires, and said timers are independently stopped based on an increase in brightness of said pixel sensors from said flash determined by said intensity comparators, producing a quantity of delay data corresponding to the time required for the light from said flash to illuminate an object, then return to the image capture device.

2. An image capture device as recited in claim 1 further comprising:

a first memory coupled with said plurality of timers wherein said first memory stores delay data from at least some of said plurality of timers.

3. An image capture device as recited in claim 2 further comprising:

a converter coupled with said first memory and a third memory, wherein said converter receives said delay data from said first memory, converts said delay data to distance data, and stores said distance data, corresponding to the distance from the image capture device to an imaged object, in said third memory.

4. An image capture device as recited in claim 1 further comprising:

a second memory coupled with said plurality of pixel sensors wherein said second memory stores image data from at least some of said plurality of pixel sensors.

5. An image capture device as recited in claim 1 wherein said flash uses infrared wavelengths of light.

6. An image capture device comprising:

a plurality of pixel sensors;

a plurality of timers individually coupled with each of said pixel sensors;

a plurality of intensity comparators coupled with said timers and said pixel sensors; and an electrical connection for an external flash coupled with said plurality of timers, wherein said timers are started when said external flash fires, and said timers are independently stopped based on an increase in brightness of said pixel sensors from said flash determined by said intensity comparators, producing a quantity of delay data corresponding to the time required for the light from said flash to illuminate an object, then return to the image capture device.

7. An image capture device as recited in claim 6 further comprising:

a first memory coupled with said plurality of timers wherein said first memory stores delay data from at least some of said plurality of timers.

8. An image capture device as recited in claim 7 further comprising:

a converter coupled with said first memory and a third memory, wherein said converter receives said delay data from said first memory, converts said delay data to distance data, and stores said distance data, corresponding to the distance from the image capture device to an imaged object, in said third memory.

9. An image capture device as recited in claim 6 further comprising:

a second memory coupled with said plurality of pixel sensors wherein said second memory stores image data from at least some of said plurality of pixel sensors.

10. An image capture device as recited in claim 6 wherein said flash uses infrared wavelengths of light.

11. A method for capturing three-dimensional data with a digital imaging system comprising the steps of:

a) initializing a plurality of timers associated with a plurality of pixel sensors;

b) initializing a plurality of intensity comparators associated with said pixel sensors and said timers with an initial intensity from said pixel sensors;

c) firing a flash and starting said timers;

d) comparing intensity of said pixel sensors with said initial intensity and stopping the timers associated with said pixel sensors that have detected said flash, producing a quantity of delay data corresponding to the time required for the light from said flash to illuminate an object, then return to the digital imaging system and e) repeating step c) until a timeout is reached.

12. A method for capturing three-dimensional data with a digital imaging system as recited in claim 11 further comprising the step of:

f) storing timing data from said plurality of timers in a first memory.

13. A method for capturing three-dimensional data with a digital imaging system as recited in claim 12 further comprising the steps of:

g) converting said timing data into distance data corresponding to the distance from the digital imaging system to an imaged object; and h) storing said distance data in a third memory.

14. A method for capturing three-dimensional data with a digital imaging system as recited in claim 11 further comprising the step of:

e) storing image data from said plurality of pixel sensors in a second memory.

15. An image capture device comprising:

means for capturing light intensity values of pixels;

means for firing a flash to light an object;

means for comparing light intensity values of pixels;

means for timing on a per pixel basis how long it takes light from said flash to reflect from said object to said means for capturing light intensity values as determined by said means for comparing light intensity values of pixels; and means for producing a quantity of delay data from said means for timing, corresponding to the time required for the light from said flash to illuminate an object, then return to the image capture device.

16. An image capture device as recited in claim 15 further comprising:

means for storing results from said means for timing.

17. An image capture device as recited in claim 15 further comprising:

means for converting said delay data to distance data said means for storing said distance data.

18. An image capture device as recited in claim 17 further comprising:

means for storing image data from said means for capturing light intensity values.

* * * * *

UNITED STATES PATENT AND TRADEMARK OFFICE
CERTIFICATE OF CORRECTION

PATENT NO. : 6,950,135 B2
APPLICATION NO. : 09/768477
DATED : September 27, 2005
INVENTOR(S) : Bret A. McKee et al.

It is certified that error appears in the above-identified patent and that said Letters Patent is hereby corrected as shown below:

In column 6, line 2, in Claim 11, delete "system" and insert -- system; --, therefor.

In column 6, line 42, in Claim 17, delete "said" and insert -- and --, therefor.

Signed and Sealed this

Twenty-second Day of December, 2009

David J. Kappos
*Director of the United States Patent and Trademark Office*